(12) United States Patent　　　　　　　　　(10) Patent No.: US 9,056,279 B1
Devarakonda　　　　　　　　　　　　　　　　(45) Date of Patent: Jun. 16, 2015

(54) SYSTEMS AND METHODS FOR CONTROLLING EMISSIONS IN AN INTERNAL COMBUSTION ENGINE THROUGH THE CONTROL OF TEMPERATURE AT THE INLET OF AN AMMONIA SLIP CATALYST ASSEMBLY

(71) Applicant: General Electric Company, Schenectady, NY (US)

(72) Inventor: Maruthi N. Devarakonda, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/154,418

(22) Filed: Jan. 14, 2014

(51) Int. Cl.
　　*G05B 1/00*　　(2006.01)
　　*G05B 21/00*　　(2006.01)
　　*F01N 3/18*　　(2006.01)
　　*F01N 3/30*　　(2006.01)
　　*B01D 53/94*　　(2006.01)

(52) U.S. Cl.
　　CPC ................. *B01D 53/9495* (2013.01)

(58) Field of Classification Search
　　CPC ........ G05B 1/00; G05B 21/00; F01N 3/2006; F01N 3/2046; F01N 3/22; F01N 3/30; B01D 53/9436
　　USPC .......................................... 700/274
　　See application file for complete search history.

(56) References Cited

U.S. PATENT DOCUMENTS 3,919,842 A * 11/1975 Bolton ............................ 60/289
　　2006/0179824 A1 * 8/2006 Roser ............................. 60/289

* cited by examiner

*Primary Examiner* — Timothy Vanoy
(74) *Attorney, Agent, or Firm* — Ernest G. Cusick; Frank A. Landgraff

(57) ABSTRACT

A method and system for controlling emissions in an engine, includes establishing a desired first temperature at an inlet (116) of an ammonia slip catalyst assembly (115); and determining a second temperature associated with a temperature at the inlet of the ammonia slip catalyst assembly (115). If the second temperature is higher than the desired first temperature, then directing an air injector (135) to add air to the inlet (116) of the ammonia slip catalyst assembly (115).

20 Claims, 3 Drawing Sheets

SYSTEMS AND METHODS FOR CONTROLLING EMISSIONS IN AN INTERNAL COMBUSTION ENGINE THROUGH THE CONTROL OF TEMPERATURE AT THE INLET OF AN AMMONIA SLIP CATALYST ASSEMBLY

BACKGROUND OF THE INVENTION

The subject matter disclosed herein generally relates to controlling emissions in an internal combustion engine and more particularly to methods and systems controlling emissions using active control of the temperature at the inlet of an ammonia slip catalyst assembly (ASC).

Environmental regulations require the use of catalysts to treat engine exhaust in order to reduce air pollution. A catalytic converter uses two types of catalysts, a reduction catalyst and an oxidation catalyst. The catalytic converter consists of a ceramic structure coated with a metal catalyst incorporated within a housing. The catalytic converter provides a structure that exposes the maximum surface area of catalyst to the exhaust stream.

A three-way catalyst assembly (TWC) is employed on stationary rich-burn engines to reduce the emissions of nitrogen oxides (NOx), hydrocarbons (HC), and carbon monoxide (CO). Because these engines operate under rich conditions, a significant portion of the engine out NOx is converted to ammonia ($NH_3$) over the TWC and is consequently emitted as a secondary emission. A typical rich-burn engine equipped with a TWC catalyst may emit around 400 ppm $NH_3$ at richer than stoichiometric conditions.

$NH_3$ emissions may be reduced with the use of an ASC. An ASC converts $NH_3$ to $N_2$. However, if the temperature at the ASC exceeds the catalyst operating window (400-510° C.), $NH_3$ may be oxidized to NOx which results in the system exceeding NOx regulations.

BRIEF DESCRIPTION OF THE INVENTION

The disclosure provides a methodology for controlling emission of NOx by controlling the temperature in an ASC.

In accordance with one exemplary non-limiting embodiment, the invention relates to a method for controlling emissions in an engine. The method includes establishing a desired first temperature at an inlet of an ASC. The method then determines a second temperature associated with a temperature at the inlet of the ASC. The method then determines whether the second temperature is higher than the desired first temperature, and if the second temperature is higher than the desired first temperature, then the method directs an air injector to add air to the inlet of the ASC.

In accordance with another embodiment, a system for controlling emissions is provided. The system includes a TWC having an outlet. A fluid conduit coupled to the outlet of the TWC is provided. The system includes an ASC having an inlet coupled to the fluid conduit. A thermocouple or other temperature measurement instrument is disposed proximate to the outlet of the TWC. The system includes an air injector coupled to the inlet of the ASC. The system also includes a subsystem that establishes a desired first temperature at the inlet of the ASC, determines a second temperature at an exit of a TWC, determines whether the second temperature is higher than the desired first temperature, and directs the air injector to add air to the inlet of the ASC if the second temperature is higher than the desired first temperature.

In another embodiment, an internal combustion engine assembly is provided. The internal combustion engine assembly includes an internal combustion engine and a TWC coupled to the internal combustion engine. The TWC is provided with an outlet. A fluid conduit is coupled to the outlet of the TWC. An ASC having an inlet is coupled to the fluid conduit is also provided. A first thermocouple is disposed proximate to the outlet of the TWC and is adapted to measure a first temperature. An air injector is coupled to the inlet of the ASC. The internal combustion engine assembly also includes a subsystem that actively controls a temperature at the inlet of the ASC by injecting air into the ASC when the first temperature exceeds a predetermined temperature.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

The disclosure provides a methodology for a system for actively controlling the temperature at the inlet of an ammonia slip catalyst assembly thereby controlling the emissions of an internal combustion engine.

Figure 1:
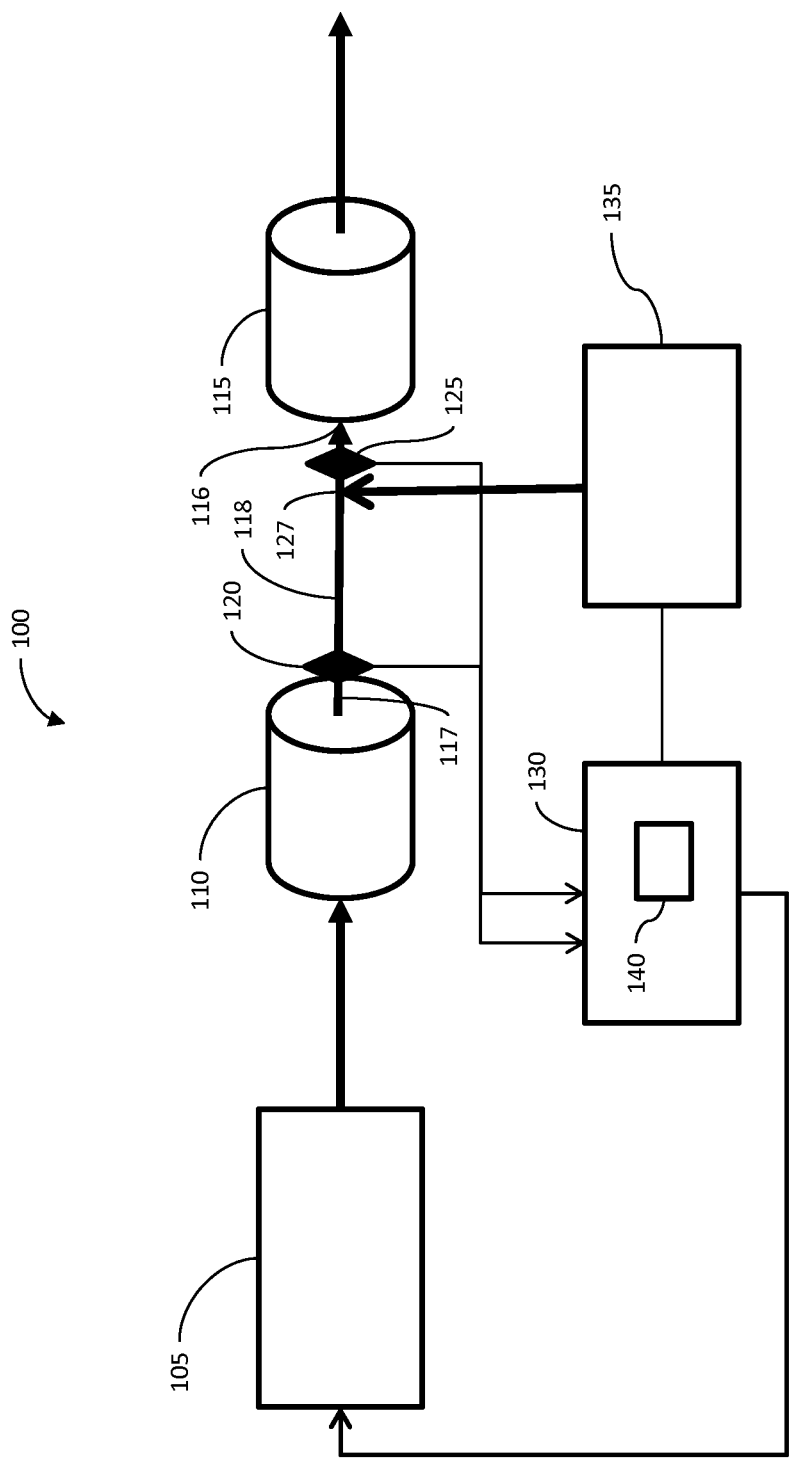
FIG. 1 is a schematic diagram of an embodiment of a system for controlling the temperature at the inlet of an ASC.

Illustrated in FIG. 1 is a schematic of a system for actively controlling the temperature at the inlet of an ASC (ASC temperature control system 100). As shown in FIG. 1, an engine 105 is provided with a TWC 110 and an ASC 115. The ASC 115 has an inlet 116 coupled to an outlet 117 of the TWC 110 through a fluid conduit 118. The ASC temperature control system 100 is provided with a first thermocouple 120 disposed proximate to the outlet of the TWC 110. The first thermocouple 120 may be one of a number of known temperature measuring devices, such as a thermocouple, resistance thermocouples, and the like. The ASC temperature control system 100 is provided with a second thermocouple 125 disposed proximate to the inlet of the ASC 115, and downstream from an air injection point 127. Outputs from first thermocouple 120 and second thermocouple 125 are communicated to a control subsystem 130 which controls an air source, such as an air injector 135. Air injector 135 injects air into the inlet 116 of the ASC 115 at air injection point 127. The control subsystem 130 may be a microcontroller, microprocessor or other control system operatively coupled to the first thermocouple 120, the second thermocouple 125, and the air injector 135. The control subsystem 130 includes a program 140 that executes instructions that actively control the temperature at the inlet 116 of the ASC 115 by injecting air into the inlet 116 of the ASC 115 when the temperature at the inlet 116 exceeds a predetermined temperature. In one embodiment, the predetermined temperature is approximately 400° C.

Figure 2:
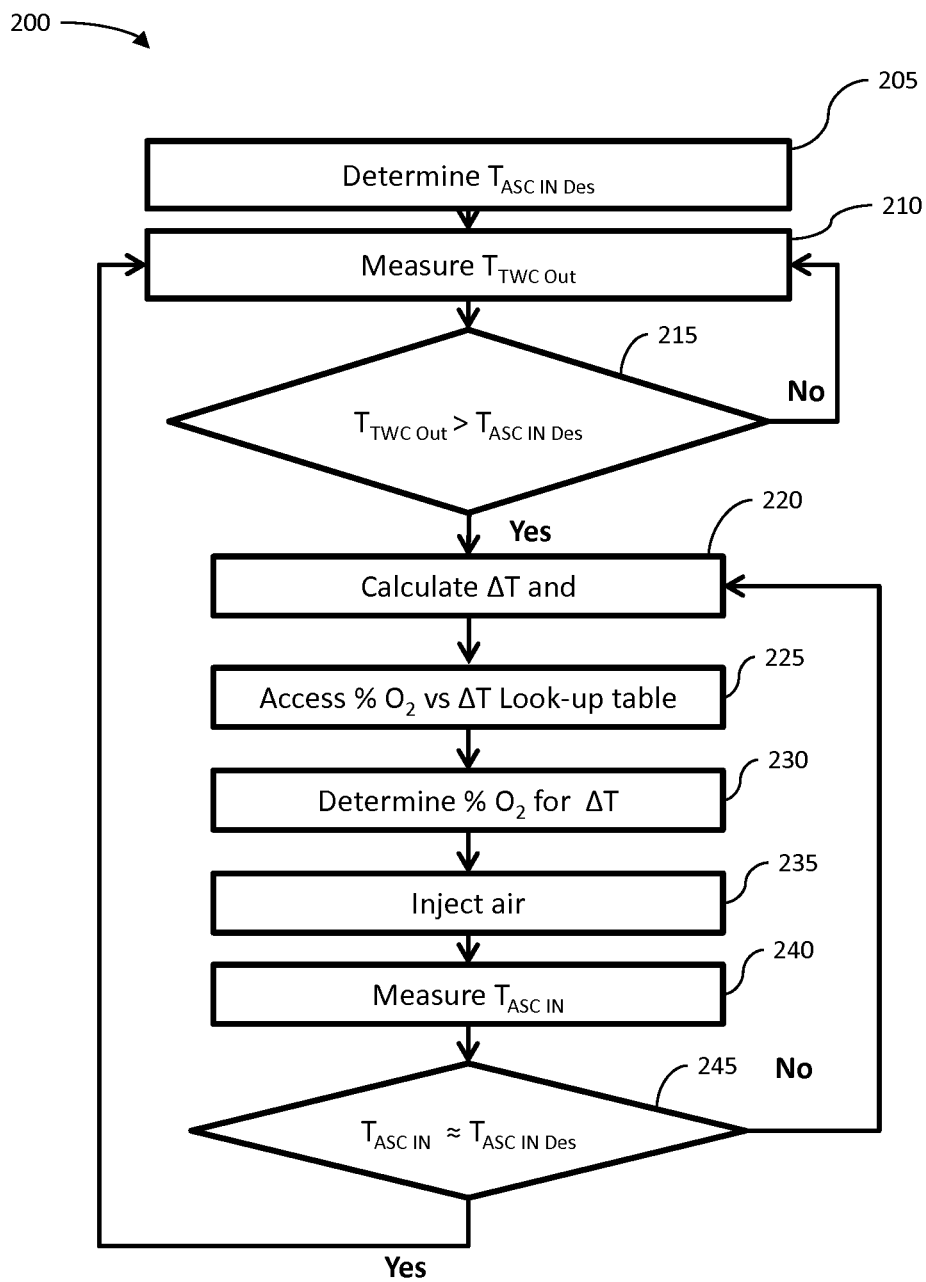
FIG. 2 is a flow chart of an embodiment of a method for controlling the temperature at the inlet of an ASC.

Illustrated in FIG. 2 is a flow chart of a method 200 executed by the program 140 for actively controlling the temperature at the inlet 116 of an ASC 115.

In step 205, the method 200 determines a desired temperature at the inlet 116 of the ASC 115 ($T_{ASC\ IN\ Des}$).

In step 210, the method 200 measures the temperature at the output of the TWC 110 ($T_{TWC\ Out}$).

In step 215, the method 200 determines whether $T_{TWC\ Out}$ is greater than $T_{ASC\ IN\ Des}$. If $T_{TWC\ Out}$ is not greater than $T_{ASC\ IN\ Des}$, the method 200 returns to step 210, to measure $T_{TWC\ Out}$.

If $T_{TWC\ Out}$ is greater than $T_{ASC\ IN\ Des}$, the method 200 proceeds to step 220 where the difference between $T_{TWC\ out}$ and $T_{ASC\ IN\ Des}$ ($\Delta T$) is calculated.

In step 225, the method 200 accesses a look-up table that correlates the percentage of oxygen to be injected into the inlet 116 (% $O_2$) with $\Delta T$.

In step 230, the method 200 determines the % $O_2$ for the calculated $\Delta T$.

In step 235, the method 200 instructs the air injector 135 to inject air into the inlet 116.

In step 240, the method 200 measures the temperature at the inlet 116 of the ASC 115 ($T_{ASC\ IN}$).

In step 245, the method 200 determines whether $T_{ASC\ IN}$ is approximately equal to $T_{ASC\ IN\ Des}$. If $T_{ASC\ IN}$ is approximately equal to $T_{ASC\ IN\ Des}$, then the method returns to step 210 to measure $T_{TWC\ Out}$. If $T_{ASC\ IN}$ is not approximately equal to $T_{ASC\ IN\ Des}$, then the method returns to step 220 where $\Delta T$ is calculated.

The technical effect of the method is to reduce the emissions of an internal combustion engine by controlling the temperature at the inlet of the ASC.

Figure 3:
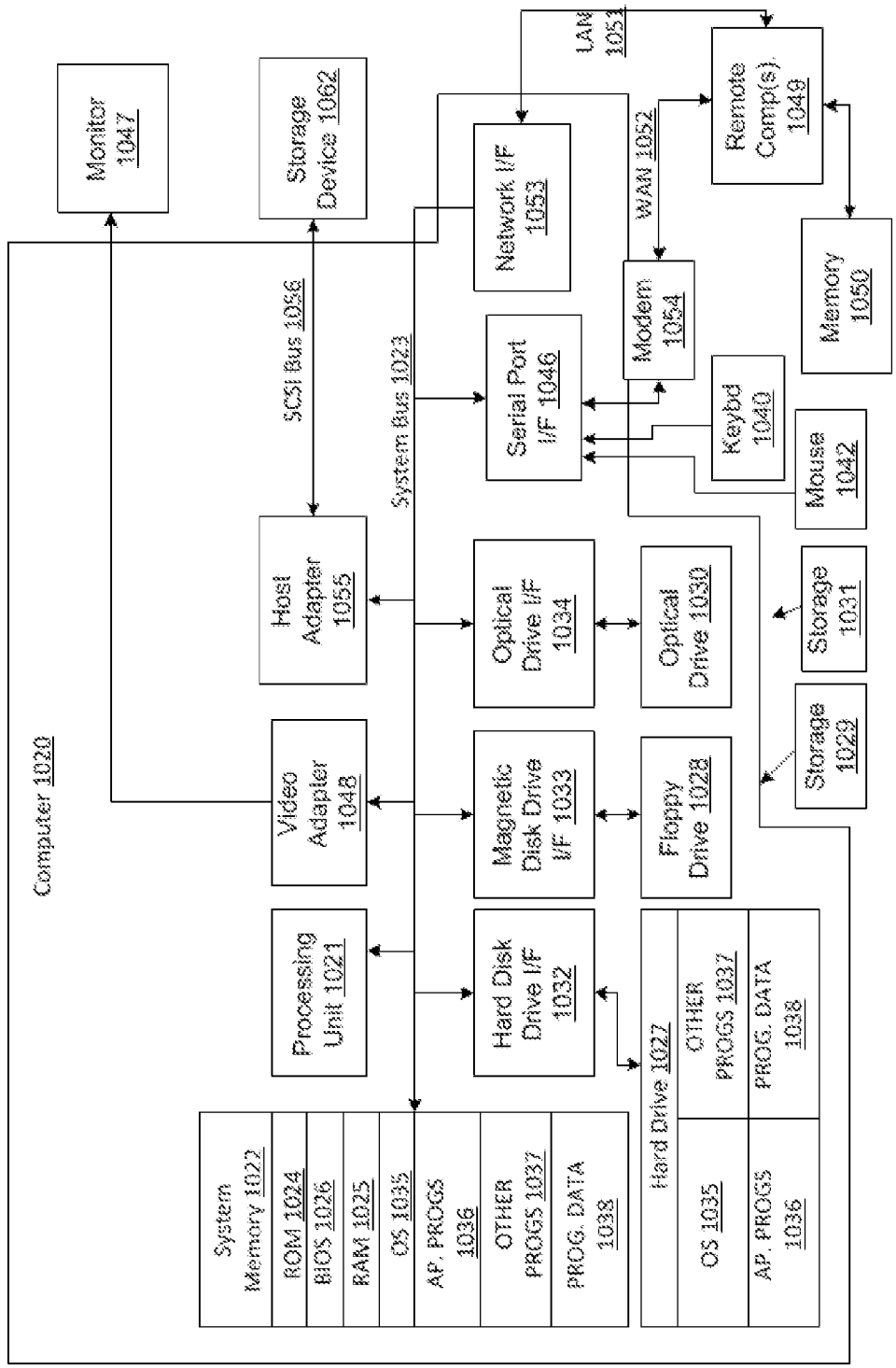
FIG. 3 is a block diagram of a general purpose computer.

FIG. 3 is a block diagram of a computer 1020 in which the control subsystem 130 may be incorporated. Computer 1020 includes a processing unit 1021, a system memory 1022, and a system bus 1023 that couples various system components including the system memory to the processing unit 1021. The system bus 1023 may be any of several types of bus structures including a memory bus or memory controller, a peripheral bus, and a local bus using any of a variety of bus architectures. The system memory includes read-only memory (ROM) 1024 and random access memory (RAM) 1025. A basic input/output system 1026 (BIOS), containing the basic routines that help to transfer information between elements within the computer 1020, such as during start-up, is stored in ROM 1024.

The computer 1020 may further include a hard disk drive 1027 for reading from and writing to a hard disk (not shown), a magnetic disk drive 1028 for reading from or writing to a removable magnetic disk 1029, and an optical disk drive 1030 for reading from or writing to a removable optical disk 1031 such as a CD-ROM or other optical media. The hard disk drive 1027, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide nonvolatile storage of computer-readable instructions, data structures, program modules and other data for the computer 1020. As described herein, computer-readable media is an article of manufacture and thus not a transient signal.

Although the exemplary environment described herein employs a hard disk, a removable magnetic disk 1029, and a removable optical disk 1031, it should be appreciated that other types of computer-readable media, which can store data that are accessible by a computer, may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, removable magnetic disk 1029, removable optical disk 1031, ROM 1024 or RAM 1025, including an operating system 1035, one or more application programs 1036, other program modules 1037 and program data 1038. A user may enter commands and information into the computer 1020 through input devices such as a keyboard 1040 and pointing device 1042. Other input devices (not shown) may include a microphone, joystick, game pad, satellite disk, scanner, or the like. These and other input devices are often connected to the processing unit 1021 through a serial port interface 1046 that is coupled to the system bus 1023, but may be connected by other interfaces, such as a parallel port, game port, or universal serial bus (USB). A monitor 1047 or other type of display device is also connected to the system bus 1023 via an interface, such as a video adapter 1048. In addition to the monitor 1047, a computer may include other peripheral output devices (not shown), such as speakers and printers. The exemplary system of FIG. 3 also includes a host adapter 1055, a Small Computer System Interface (SCSI) bus 1056, and an external storage device 1062 connected to the SCSI bus 1056.

The computer 1020 may operate in a networked environment using logical connections to one or more remote computers, such as a remote computer 1049. The remote computer 1049 may be a personal computer, a server, a router, a network PC, a peer device or other common network node, and may include many or all of the elements described above relative to the computer 1020, although only a memory storage device 1050 has been illustrated in FIG. 3. The logical connections depicted in FIG. 3 include a local area network (LAN) 1051 and a wide area network (WAN) 1052. Such networking environments are commonplace in offices, enterprise-wide computer networks, intranets, and the Internet.

When used in a LAN networking environment, the computer 1020 is connected to the LAN 1051 through a network interface or adapter 1053. When used in a WAN networking environment, the computer 1020 may include a modem 1054 or other means for establishing communication over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing a communication link between the computers may be used.

Computer 1020 may include a variety of computer-readable storage media. Computer-readable storage media may be any available media that can be accessed by computer 1020 and includes both volatile and nonvolatile media, removable and non-removable media. By way of example, and not limitation, computer-readable media may comprise computer storage media and communication media. Computer storage media include both volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1020. Combinations of any of the above should also be included within the scope of computer-readable media that may be used to store source code for implementing the methods and systems described herein. Any combination of the features or elements disclosed herein may be used in one or more embodiments.

Where the definition of terms departs from the commonly used meaning of the term, applicant intends to utilize the definitions provided below, unless specifically indicated.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a", "an" and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed:

1. A method for controlling emissions in an engine, the method comprising:
   establishing a desired first temperature at an inlet of an ammonia slip catalyst assembly;
   determining a second temperature associated with a temperature at the inlet of the ammonia slip catalyst assembly;
   determining whether the second temperature is higher than the desired first temperature; and
   if the second temperature is higher than the desired first temperature, then directing an air injector to add air to the inlet of the ammonia slip catalyst assembly.

2. The method for controlling emissions of claim 1, further comprising calculating a difference between the second temperature and the desired first temperature.

3. The method for controlling emissions of claim 1, further comprising accessing a look-up table that establishes a relationship between % $O_2$ and a difference between the second temperature and the desired first temperature.

4. The method for controlling emissions in an engine of claim 2, further comprising determining the % $O_2$ required for the difference between the second temperature and the desired first temperature.

5. The method for controlling emissions of claim 1, further comprising injecting air into the ammonia slip catalyst assembly.

6. The method for controlling emissions of claim 1, further comprising measuring the temperature at the inlet of the ammonia slip catalyst assembly.

7. The method for controlling emissions of claim 1, further comprising:
   determining if a temperature at the inlet of the ammonia slip catalyst assembly is approximately equal to the desired first temperature;
   if the temperature at the inlet of the ammonia slip catalyst assembly is approximately equal to the desired first temperature then determining the second temperature; and
   if the temperature at the inlet of the ammonia slip catalyst assembly is not approximately equal to the desired first temperature then calculating a difference between the second temperature and the desired first temperature.

8. A system for controlling emissions comprising:
   a three-way catalyst assembly having an outlet;
   a fluid conduit coupled to the outlet of three-way catalyst assembly;
   an ammonia slip catalyst assembly having an inlet coupled to the fluid conduit;
   a thermocouple disposed proximate to the outlet of the three-way catalyst assembly;
   an air injector coupled to the inlet of the ammonia slip catalyst assembly; and
   a subsystem that:
      establishes a desired first temperature at the inlet of the ammonia slip catalyst assembly;
      determines a second temperature at the outlet of the three-way catalyst assembly;
      determines whether the second temperature is higher than the desired first temperature; and
      directs the air injector to add air to the inlet of the ammonia slip catalyst assembly if the second temperature is higher than the desired first temperature.

9. The system for controlling emissions of claim 8, wherein the subsystem comprises a subsystem that calculates a difference between the second temperature and the desired first temperature.

10. The system for controlling emissions of claim 8, wherein the subsystem comprises a subsystem that accesses a look-up table that establishes a relationship between % $O_2$ and a difference between the second temperature and the desired first temperature.

11. The system for controlling emissions of claim 10, wherein the subsystem comprises a subsystem that determines the % $O_2$ required for the difference between the second temperature and the desired first temperature.

12. The system for controlling emissions of claim 8, wherein the subsystem comprises a subsystem that directs a measurement of the second temperature if the second temperature is not higher than the desired first temperature.

13. The system for controlling emissions of claim 8, wherein the subsystem comprises a subsystem that measures a temperature at the inlet of the ammonia slip catalyst assembly.

14. The system for controlling emissions of claim 8, wherein the subsystem comprises a subsystem that:
   determines if a temperature at the inlet of the ammonia slip catalyst assembly is approximately equal to the desired first temperature;
   if the temperature at the inlet of the ammonia slip catalyst assembly is approximately equal to the desired first temperature then determines the second temperature at the outlet of the three-way catalyst assembly; and
   if the temperature at the inlet of the ammonia slip catalyst assembly is not approximately equal to the desired first temperature then calculates a difference between the second temperature and the desired first temperature.

15. An internal combustion engine assembly comprising:
   an internal combustion engine;
   a three-way catalyst assembly coupled to the internal combustion engine, the three-way catalyst assembly having an outlet;
   a fluid conduit coupled to the outlet of the three-way catalyst assembly;
   an ammonia slip catalyst assembly having an inlet coupled to the fluid conduit;

a first thermocouple disposed proximate to the outlet of the three-way catalyst assembly adapted to measure a first temperature;
an air injector coupled to the inlet of the ammonia slip catalyst assembly; and
a subsystem that actively controls a temperature at the inlet of the ammonia slip catalyst assembly by injecting air into the ammonia slip catalyst assembly when the first temperature exceeds a predetermined temperature.

16. The internal combustion engine assembly of claim 15, wherein the subsystem that actively controls the temperature at the inlet of the ammonia slip catalyst assembly comprises a subsystem that:
  establishes a desired first temperature at the inlet of the ammonia slip catalyst assembly;
  determines a second temperature at the outlet of a three-way catalyst;
  determines whether the second temperature is higher than the first temperature; and
  directs the air injector to add air to the inlet of the ammonia slip catalyst assembly if the second temperature is higher than the first temperature.

17. The internal combustion engine assembly of claim 16, wherein the subsystem that actively controls the temperature at the inlet of the ammonia slip catalyst assembly comprises a subsystem that calculates a difference between the second temperature and the first temperature.

18. The internal combustion engine assembly of claim 16, wherein the subsystem that actively controls the temperature at the inlet of the ammonia slip catalyst assembly comprises a subsystem that accesses a look-up table that establishes a relationship between % $O_2$ and a difference between the second temperature and the first temperature.

19. The internal combustion engine assembly of claim 18, wherein the subsystem that actively controls the temperature at the inlet of the ammonia slip catalyst assembly comprises a subsystem that determines the % $O_2$ required for the difference between the second temperature and the first temperature.

20. The internal combustion engine assembly of claim 16, wherein the subsystem that actively controls the temperature at the inlet of the ammonia slip catalyst assembly comprises a subsystem that:
  determines if a temperature at the inlet of the ammonia slip catalyst assembly is approximately equal to the desired first temperature;
  if the temperature at the inlet of the ammonia slip catalyst assembly is approximately equal to the desired first temperature then determines a second temperature at an exit of the three-way catalyst assembly; and
  if the temperature at the inlet of the ammonia slip catalyst assembly is not approximately equal to the desired first temperature then calculates a difference between the second temperature and the first temperature.

* * * * *

UNITED STATES PATENT AND TRADEMARK OFFICE
CERTIFICATE OF CORRECTION

PATENT NO. : 9,056,279 B1
APPLICATION NO. : 14/154418
DATED : June 16, 2015
INVENTOR(S) : Devarakonda Page 1 of 1

It is certified that error appears in the above-identified patent and that said Letters Patent is hereby corrected as shown below:

In the specification

In Column 3, Line 20, delete "$T_{TWC\ Out}$" and insert -- $T_{TWC\ Out.}$ --, therefor.

Signed and Sealed this
Twenty-third Day of August, 2016

Michelle K. Lee
*Director of the United States Patent and Trademark Office*